US012420680B2

(12) United States Patent
Sezgin

(10) Patent No.: US 12,420,680 B2
(45) Date of Patent: Sep. 23, 2025

(54) RAIL CLOSING STRUCTURE

(71) Applicant: FKT KOLTUK SISTEMLERI ÜRETIM VE DAGITIM SANAYI VE TICARET ANONIM SIRKETI, Bursa (TR)

(72) Inventor: Emin Sezgin, Bursa (TR)

( * ) Notice: Subject to any disclaimer, the term of this patent is extended or adjusted under 35 U.S.C. 154(b) by 385 days.

(21) Appl. No.: 18/314,537

(22) Filed: May 9, 2023

(65) Prior Publication Data

US 2023/0365031 A1 Nov. 16, 2023

(30) Foreign Application Priority Data

May 10, 2022 (TR) .............................. 2022/007595

(51) Int. Cl.
*B60N 2/00* (2006.01)
*B60N 2/07* (2006.01)

(52) U.S. Cl.
CPC .................................. *B60N 2/0725* (2013.01)

(58) Field of Classification Search
CPC ...... B60N 2/0725; B60N 2/0727; B60N 2/07; B60N 2/06
USPC ..................................................... 296/65.13
See application file for complete search history.

(56) References Cited

U.S. PATENT DOCUMENTS

| | | | | |
|---|---|---|---|---|
| 5,482,243 A | * | 1/1996 | Minder | B60N 2/0725 248/429 |
| 2014/0097662 A1 | * | 4/2014 | Kohn | B64C 1/20 297/463.1 |
| 2014/0265463 A1 | * | 9/2014 | Phinney | B60N 2/0725 297/182 |
| 2019/0308526 A1 | * | 10/2019 | Gross | B64D 11/0696 |
| 2025/0001910 A1 | * | 1/2025 | Jonsson | B60N 2/0725 |

FOREIGN PATENT DOCUMENTS

| | | |
|---|---|---|
| TR | 2007/06108 U | 4/2007 |
| TR | 2013/00433 B | 11/2013 |
| TR | 2020/08258 B | 5/2020 |

* cited by examiner

*Primary Examiner* — Steven O Douglas
(74) *Attorney, Agent, or Firm* — Egbert, McDaniel & Swartz, PLLC

(57) ABSTRACT

A rail closing structure for preventing gaps on the floor rails to which the rail seat systems are connected in the travel buses from closing due to debris includes: a long part that folds upwards and lies at a certain angle towards the foot part of the movable seat during the forward and backward movement of the movable seat, is connected to the adjustable rail fixing part by a pin to close the floor rails of the vehicle; a movable short part that folds upwards and lies at a certain angle towards the foot part of the movable seat during the forward and backward movement of the movable seat, is connected to the long part and the rail fixing piece, which is connected to the movable seat, that closes the floor rails of the vehicle, by a pin; and a fixed long rail connected to the rail of the vehicle.

5 Claims, 2 Drawing Sheets

RAIL CLOSING STRUCTURE

CROSS-REFERENCE TO RELATED APPLICATIONS

Not applicable.

BACKGROUND OF THE INVENTION

1. Field of the Invention

The present invention relates to the rail closing structure developed to prevent the gaps on the floor rails to which the rail seat systems are connected in the travel buses, from closing due to the dirt, dust, parts and derivatives formed over time.

2. Description of Related Art Including Information Disclosed Under 37 CFR 1.97 and 37 CFR 1.98

The connection between the seats and the floor is provided by rails in buses used in public transportation. These rails are first connected to the bus floor so as to mount the seats to the bus body. Then the seats are mounted on these rails. Said rails enable the seat to move forward and backward.

Today, there is no closing structure on these floor rails of the seat mechanisms of the rail system. The open top of the rails causes foreign materials such as dust and dirt to be filled into this part, which has a gap in the form of a channel due to its nature. The accumulation of foreign materials in this rail channel on the floor makes the movement of the seat in the rail channel to be difficult and restricted.

Many studies have been carried out today so as to improve bus seat mounting rails. One of these studies is the invention subject to the patent numbered TR 2013/00433 and titled as "Floor rail production and assembly method". The invention, which is the subject of the application, relates to the production and mounting method of frame rails and seat rails, or in other words, floor rails, used for the assembly of seats in travel and/or public transportation buses.

Another study is the invention subject to the patent numbered TR 2020/08258 and titled as "A new seat rail design for the bus". The invention relates to bus seat connection constructions in which the seat connection rail on the floor is connected to the infrastructure and pipe construction by means of a cage nut and the seat is mounted to the seat connection rail, characterized by comprising an additional rail on which the seat connection and the service table are mounted and the service table moves together with the rubber element so as to form a bus seat connection, where the service desk can be securely connected, aluminum profile or profile formed as a whole with the seat rail on which the seat is mounted.

Another study is the invention that is the subject of the utility model application numbered TR 2007/06108 and titled "Passenger seat guide rail and assembly for buses". This invention relates to the guide rail that enables the passenger seats to be mounted on the vehicle floor in buses and the assembly of this rail. In said guide rail; the rail channel portion where the seat leg connector sits is located on the side of the corridor. Therefore, since the channel part of the guide rail is not visible to the passengers, it is not necessary to cover the same with a wick. In addition, since the guide rail, which is the subject of the invention, is produced from matt aluminum, it does not require any coating and the corrosion resistance of aluminum delays the corrosion that will occur on the rails over time.

All these studies focused on facilitating the assembly of the rail and/or seat. In the newly developed structures, the rail channel is open against foreign materials and the movement of the seat is restricted over time. As a result, the requirement for a rail closing structure which eliminates the abovementioned problems and the insufficiency of the current solutions makes it necessary to make a development in the relevant technical field.

BRIEF SUMMARY OF THE INVENTION

The present invention relates to the rail closing structure developed to prevent the gaps on the floor rails to which the rail seat systems are connected in the travel buses, from closing due to the dirt, dust, parts and derivatives formed over time which fulfils the abovementioned requirements, eliminates all disadvantages and brings some additional advantages.

The aim of the present invention based on the state of the art, is to prevent foreign materials from entering the rail channel by means of the rail closing structure.

The aim of the present invention is to prevent the accumulation of foreign matter in the rail channel, so that the forward and backward movement of the seat on the rail is carried out easily without being affected by pollutants.

Another aim of the present invention is to ensure that the channel is protected against all polluting external factors, with the help of the closing structure that is closed on the rail channel that remains open after the seat is fixed in the appropriate position.

Another aim of the present invention is to allow the movable seat to move forward and backward even when the rail closing structure is mounted, with the help of the foldable structure of the rail closing structure.

The structural and characteristic features of the present invention will be understood clearly by the following drawings and the detailed description made with reference to these drawings and therefore the evaluation shall be made by taking these figures and the detailed description into consideration.

BRIEF DESCRIPTION OF THE SEVERAL VIEWS OF THE DRAWINGS

In order to understand the advantages of the present invention with its structure and additional elements, it shall be evaluated with the following defined figures.

REFERENCE NUMBERS

Figure 1:
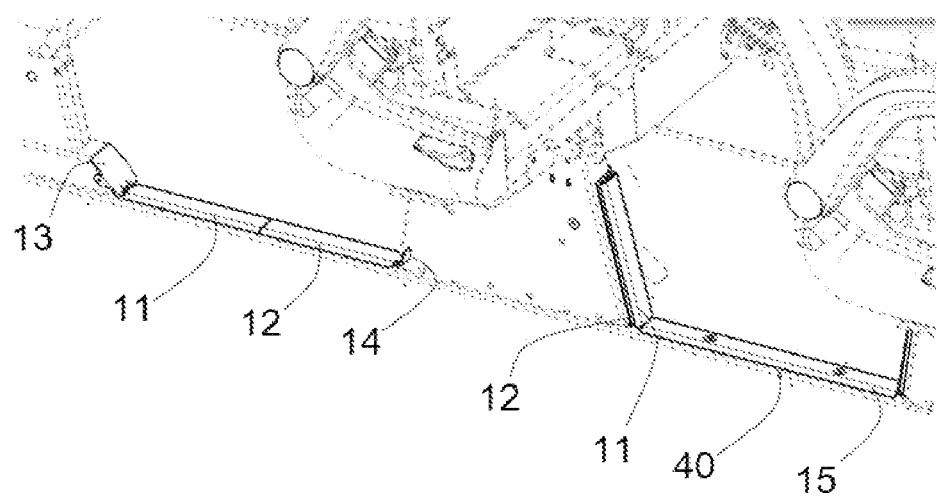
FIG. 1 is a schematic general view of the rail-mounted state of the rail closing structure.

10. Rail closing structure
11. Long part
12. Short part
13. Adjustable rail fixing part
14. Rail fixing part
15. Fixed long rail
20. Fixed seat 30. Movable seat
40. Rail

DETAILED DESCRIPTION OF THE INVENTION

In this detailed description, the rail closing structure (10) developed to prevent the gaps on the floor rails (40) to which the rail seat systems are connected in the travel buses, from closing due to the dirt, dust, parts and derivatives formed over time is explained only as an example for a better understanding of the subject and in a way that does not create any limiting effect.

The inventive rail closing structure (10), which is shown in FIG. 1, has been developed so as to solve the problem of limiting and forcing the seat movement due to dirt, dust, fragments and derivatives accumulating over time in the gaps of the floor rails (40) where the rail seat systems are connected in travel buses. The movable seat (30) mechanisms, which are moved backward and forward on the rails (40), can easily move without being affected by the existing dirt, dust, etc. conditions with the help of said ail closing structure (10). Said rail closing structure (10) comprises; a long part (11) positioned to close the floor rails (40) of the vehicle; a movable short part (12) closing the floor rails (40) of the vehicle; an adjustable rail fixing part (13), which connects the rail closing structure (10) to the fixed seat (20); a rail fixing part (14) connecting the rail closing structure (10) to the movable seat (30); and a fixed long rail (15) connected to the rail (40) of the vehicle.

Figure 2:
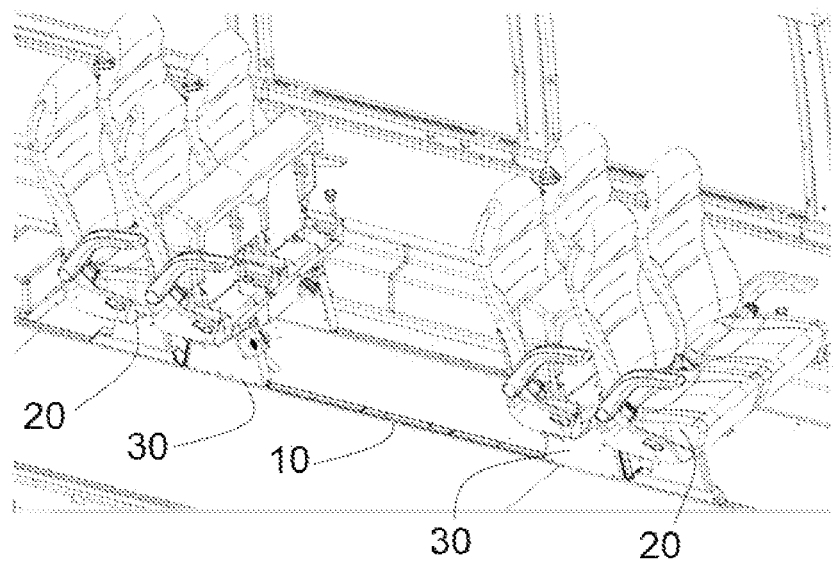
FIG. 2 is a schematic general view of the application form of the rail closing structure.
Figure 3:
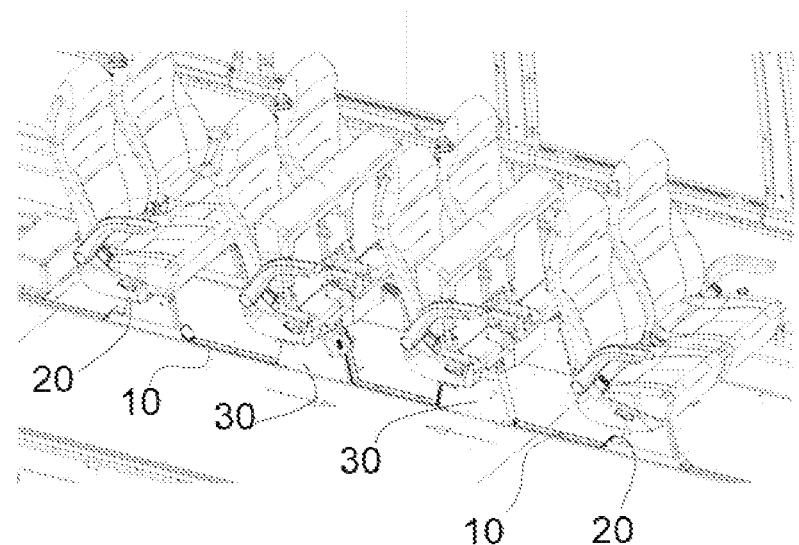
FIG. 3 is a schematic general view of the application form of the rail closing structure.

There are 2 different seat types on the floor rails (40) of the vehicle shown in FIG. 2. The first of these are fixed seats (20) that are fixed to the floor rail (40) of the vehicle and are not moved on the rail (40), and the second are the seats (30) that can move backward and forward on the floor rail (40) of the vehicle. The long part (11) in the rail closing structure (10) developed so that dust, dirt and foreign substances do not enter/accumulate in the channel part, which is in the form of a gap in the middle part of the rails (40) placed on the floor of the vehicle, is connected to the adjustable rail fixing part (13) with the help of pins. Said adjustable rail fixing part (13) is connected to the fixed seat (20). Then, the short part (12) is combined with the long part (11) by means of a pin. Said short part (12) is connected to the rail fixing part (14) connected to the movable seat (30) by means of a pin. The movable seat (30) shown in FIG. 3 lies at a certain angle towards the foot part of the movable seat (30) by folding the long part (11) and the short part (12) upwards during the backward and forward movement. The same mechanism is used on the fixed long rail (15), and it is connected by means of a pin and used between two movable seats (30).

The inventive rail closing structure (10) creates a barricade for any foreign material entry to the open parts of the rails (40) after being fixed in the appropriate position during the backward and forward movement of the movable seat (30) in the rail seat mechanisms used in the travel buses. The accumulation of foreign materials entering between the rails (40) over time causes the movable seat (30) mechanism to be forced and subsequently, the seat mechanism is completely blocked. Said rail closing structure (10) eliminates this problem.

Figure 4:
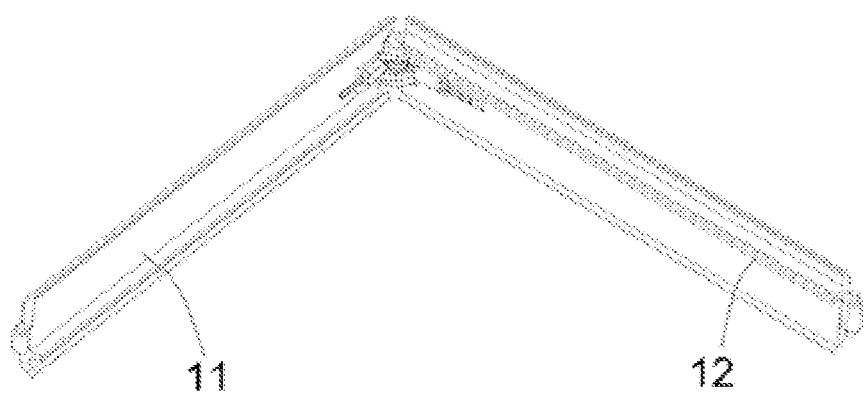
FIG. 4 is a schematic general view of a preferred embodiment of the invention.

In a preferred embodiment of the present invention shown in FIG. 4, the long part (11) and the short part (12) placed on the rails (40) are made in such a way as to facilitate the folding of the part where they join with the pin so as to make the folding movement performed in the upward direction.

In another preferred embodiment of the present invention, a hinge, spring or a similar element is attached to the part where the long part (11) and the short part (12) placed on the rails (40) are combined with the pin so as to make the upward folding movement.

I claim:

1. A rail closing structure for preventing gaps on floor rails to which rail seat systems are connected in travel buses, from closing due to the dirt, dust, parts and derivatives formed over time, the rail closing structure comprising:
    a long part that folds upwards and lies at a certain angle towards a foot part of a movable seat during forward and backward movement of the movable seat, is connected to an adjustable rail fixing part by means of a pin to close the floor rails of the vehicle;
    a movable short part that folds upwards and lies at a certain angle towards the foot part of the movable seat during the forward and backward movement of the movable seat, is connected to the long part and the rail fixing part, which is connected to the movable seat, that closes the floor rails of the vehicle, by means of a pin; and
    a fixed long rail connected to the rail of the vehicle.

2. Rail closing structure according to claim 1, wherein the adjustable rail fixing part connects the rail closing structure to the fixed seat.

3. Rail closing structure according to claim 1, wherein the rail fixing part connects the closing structure to the movable seat.

4. Rail closing structure according to claim 1, comprising a pin connecting the long part to the adjustable rail fixing part, the short part to the long part, and the short part to the rail fixing part connected to the movable seat.

5. Rail closing structure according to claim 1, wherein the part where the long part and the short part placed on the rails is hinged so as to make the upward folding movement.

* * * * *